April 21, 1964  R. S. HOCH  3,129,763
VALVE FOR WELL OPERATION
Filed May 26, 1961

INVENTOR.
R. S. HOCH

3,129,763
VALVE FOR WELL OPERATION
Robert S. Hoch, Bartlesville, Okla., assignor to Phillips Petroleum Company, a corporation of Delaware
Filed May 26, 1961, Ser. No. 112,904
10 Claims. (Cl. 166—224)

This invention is concerned with a valve for use in well drilling operations. A specific aspect of the invention relates to an insert type fill valve for cementing operations which allows full circulation.

The invention provides an orifice type fill valve comprising a main valve body member which can be inserted in a collar recess in the casing string. A sleeve member seats on a valve seat at the lower end of the bore in the main valve body member and is spring biased against the seat but displaceable therefrom for full circulation thru the valve when the sleeve orifice is plugged. The sleeve comprises a lower section of restricted inner diameter, forming an orifice, and an upper section of larger diameter providing a cylindrical sealing surface for sealing with a plug to be inserted in the sleeve. The sleeve contains on its inner wall an upwardly facing shoulder adjacent the restricted lower section and a downwardly facing shoulder below the upper sealing surface for engagement with a locking ring or similar means on the plug. The lower end of the sleeve is held in alignment by a surrounding collar provided with an upwardly facing shoulder adapted to engage a downwardly facing shoulder on the outer wall of the sleeve so as to provide a stop for the sleeve when pumping fluid thru the valve with a plug in the sleeve. The collar around the sleeve is supported by a spider construction depending from the main body member which permits flow through the valve and around the sleeve.

It is an object of the invention to provide an improved fill valve for operation in a well. Another object is to provide an insert type fill valve which allows full flow. A further object is to provide a fill valve of simple and relatively inexpensive construction. It is also an object of the invention to provide a fill valve utilizing a sleeve type back pressure valve rather than a flapper valve to prevent back flow thru the valve. Other objects of the invention will become apparent to one skilled in the art upon consideration of the accompanying disclosure.

Figure 1:
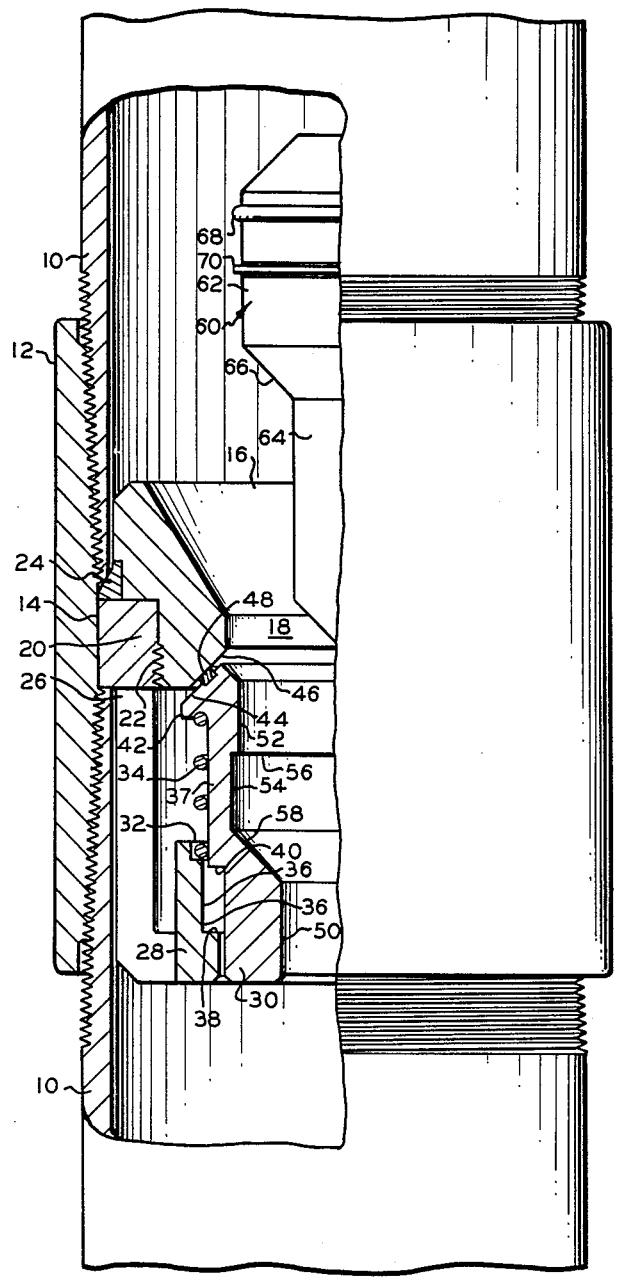
Figure 2:
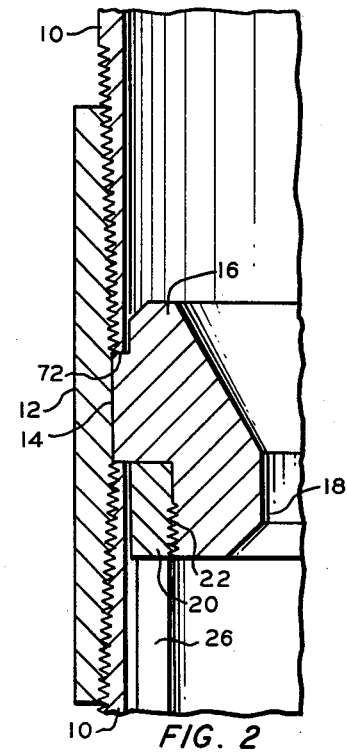
Figure 3:
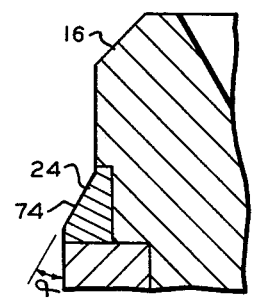

A more complete understanding of the invention may be had by reference to the accompanying schematic drawing of which FIGURE 1 is a front elevation in partial cross section showing a preferred embodiment of the valve of the invention; FIGURE 2 is a fragmentary cross section of a portion of a valve arrangement similar to that of FIGURE 1; and FIGURE 3 is a partial cross section of the valve of FIGURE 1 showing the detail of the seal between the valve body and the casing and coupling.

Referring to FIGURE 1, casing joints 10 are connected by pipe coupler 12 forming a recess 14 between the ends of the joints of casing. The main valve body 16 is annular in shape to provide cylindrical bore 18. An annular or ring member 20 is threaded to main body member 16 at 22 and has a radial flange extending into recess 14 to support the valve assembly in the casing. A seal 24 in the form of resilient material, such as rubber or plastic, forms a seal between the valve and the casing.

Ring 20 is attached to the legs 26 of a spider depending therefrom. An axial collar 28 is attached to the lower ends of legs 26 and provides a guide and support for sleeve 30 which slidably engages the collar. A groove 32 on the inner wall of collar 28 at its upper end provides a shoulder for biasing spring 34. A second groove 36 in an intermediate section of the inner wall of collar 28 provides a recess for the intermediate section 37 of the slide valve or sleeve 30 and a shoulder stop 38 for engaging a downwardly facing matching shoulder 40 on the sleeve. A downwardly facing shoulder 42 at the upper end of the sleeve serves as a working surface for spring 34 to permit same to urge the sleeve upwardly. The upper end of the sleeve 30 is provided with a matching surface 44 for valve seat 46, positioned at the lower end of bore 18 in main valve body member 16. A seal ring 48 in surface 44 forms a seal between the sleeve and the seat 46.

The lower section of sleeve 30 is provided with a bore 50 of reduced or restricted cross section relative to the upper bore of the sleeve so as to provide an orifice of desired capacity. The upper section of the sleeve has a larger bore 52 forming a cylindrical sealing surface for a plug described hereinafter. The intermediate section of sleeve 30 is provided with a bore 54 of larger diameter than 52 so as to provide a downwardly facing shoulder 56 for engaging a locking device or ring on the plug. The shoulder 58 is upwardly facing and provides a supporting shoulder or seat for supporting the plug.

The valve is assembled by placing sleeve 30 in the position shown in the drawing with spring 34 surrounding same and then threading the ring member 20, with its dependently supporting collar 28, onto the lower side of main valve body member 16. The valve is then ready for inserting into a pipe string.

Plug 60 comprises a main cylindrical section 62 and a subjacent stem 64 with a downwardly facing shoulder or seat 66 intermediate the stem and the main cylindrical section. A seal ring 68 and a locking ring 70 are fitted in grooves in the outer wall of the cylindrical member 62. The diameter of cylindrical section 62 is slightly less than the diameter of bore 52 of sleeve 30 so as to provide a seal between O-ring 68 and bore 52 when plug 60 is seated. This plug seats when downwardly facing shoulder 66 engages or approaches upwardly facing shoulder 58 in sleeve 30. In this position, locking ring 70 slips past shoulder 56 and expands to lock the plug in place so that when pumping is stopped, back pressure on the valve and plug does not force the plug out of the sleeve but merely forces it against shoulder 56. Stem 64 is sized to easily pass into and thru orifice 50.

In cementing operations or at any time when it is desired to pump fluid thru the casing without allowing fluid to pass back thru the casing when pumping is stopped, the fill valve is inserted at the desired location in the casing string by placing the same in the recess in coupling 12 before attaching the coupling to the second joint of casing. The casing is run in conventional manner with full flow thru orifice 50 until the valve is at the desired level in the hole. Cement is then forced thru the valve and plug 60 follows the cement down the casing so that, when all of the cement passes thru orifice 50, plug 60 is forced into sleeve 30 by the pumping pressure of drilling fluid above the column of cement. This seals off the bore of the valve below the upper end of sleeve 30 so that pumping pressure on the plug displaces sleeve 30 against the resistance of compression spring 34 thereby permitting bypassing of fluid thru the valve around sleeve 30 and between the legs 26 of the supporting spider. The provision for displacement of sleeve 30 a substantial distance by the sleeve and collar construction and arrangement providing ample vertical movement of the sleeve, facilitates rapid flow thru the valve when the plug is seated in position in the sleeve. This provides full flow thru the valve during cementing operations.

Referring to FIGURE 2 an embodiment of the valve structure is shown wherein an annular radial projection 72 on main valve body 16 extends into recess 14 between the joints of casing. Supporting ring 20 threads onto the lower section of member 16 at 22 but does not extend into recess 14 as in FIGURE 1. The valve assembly may be attached to the pipe string by other means such as by threading into a pipe collar or short length of pipe.

Referring to FIGURE 3, sealing ring 24 around main valve body member 16 is formed with an angle 74 which coincides with the inside bevel of pipe 10, thereby facilitating the seal. This seal is under pressure applied by the ends of the pipe joints when same are threaded into coupling 12.

Certain modifications of the invention will become apparent to those skilled in the art and the illustrative details disclosed are not to be construed as imposing unnecessary limitations on the invention.

I claim:

1. A fill valve useful in cementing operations in a well comprising, in combination, an annular main body member having an axial bore and a downwardly facing valve seat at the lower end of said bore; an annular sleeve support dependably attached to said body member providing a sleeve-supporting collar spaced from said member, said body member and said sleeve support forming an assembly having means for sealably attaching said assembly to a casing string; an upwardly facing shoulder on the inner wall of said collar; an axial sleeve positioned within said body member and said sleeve support slidable axially therein and provided with an axial bore forming an orifice at its lower end; an annular passageway between said sleeve and said support communicating with said valve seat; a passageway thru said sleeve support connecting with said annular passageway; a matching valve surface for said valve seat on the upper end of said sleeve; a matching shoulder on the outer surface of said sleeve for engaging aforesaid upwardly facing shoulder to provide a stop for said sleeve; a downwardly facing shoulder on the wall of the bore of said sleeve intermediate its ends; an upwardly facing shoulder on the wall of the bore of said sleeve below said downwardly facing shoulder; and means for spring biasing said sleeve against said valve seat.

2. The fill valve of claim 1 including a cylindrical plug adapted to fit fitting the upper section of the bore of said sleeve and having a stem on its lower end adapted to pass into said orifice; a downwardly facing shoulder on said plug adjacent the upper end of said stem adapted to engage the upwardly facing shoulder in the bore of said sleeve to support said plug in said sleeve; a locking ring in the wall of said plug adapted to expand radially to engage the downwardly facing shoulder in the wall of the bore of said sleeve; and a sealing ring in the wall of said plug above said locking ring for forming a seal with the wall of the bore of said sleeve when said plug is supported therein.

3. A fill valve for running in a well comprising, in combination,
   (1) an annular main body member having an axial bore and a downwardly facing valve seat at the lower end of said bore;
   (2) means for supporting said body member in a well casing in sealed relation therewith;
   (3) an axial annular sleeve support collar spaced below and apart from said body member and detachably attached to said body member by collar support means having a radial flow passageway therethru;
   (4) an axial sleeve having a matching valve surface for said valve seat on its upper end, said sleeve being slidably positioned within said collar and forming an annulus with said collar support means, said sleeve being spring biased into seating position on said valve seat and held in axial alignment by said collar; and
   (5) an axial bore thru said sleeve comprising a lowermost section of smallest diameter forming an orifice, an uppermost cylindrical section of intermediate diameter providing a sealing wall for a plug for said bore, an intermediate section of larger diameter than each said section to form a supporting shoulder for said plug between said intermediate and lowermost sections and a locking shoulder between said intermediate and uppermost sections.

4. In combination with the valve of claim 3, a plug comprising a cylindrical main section of substantially the same diameter as the uppermost section of the bore of said sleeve; a stem below said main section adapted to pass into said orifice; a seal ring on said main section for sealing with said uppermost section; and a locking ring on said main section below said seal ring; and a shoulder between said stem and said main section for engaging said supporting shoulder.

5. The fill valve of claim 3 including a seal ring on the said matching valve surface of said sleeve.

6. The fill valve of claim 3 wherein said collar support means comprises a depending spider attached at the lower end to said collar and at the upper end to an annular member surrounding and threaded onto a lower restricted section of said main body member.

7. The fill valve of claim 6 wherein said annular member is adapted to fit between the ends of a pipe joints attached by a common pipe coupling and a seal member is provided intermediate the end of the upper pipe joint and both said main body member and said annular member.

8. The fill valve of claim 3 wherein said collar support means comprises a spider depending from an annular member surrounding and threaded onto a lower restricted section of said main body member and said main body member is provided with a radially projecting annular section above said annular member adapted to project into the space between the ends of pipe joints connected by a common pipe coupling for supporting said fill valve.

9. A valve comprising in combination an annular main valve body member having an axial bore and a downwardly directed valve seat at the lower end of said bore when positioned in a well conduit; means for attaching said valve body member in said well conduit in sealed relation thereto; a sleeve having on its upper end a matching valve surface for said seat; sleeve support means for slidably supporting said sleeve below said seat for vertical movement thereof into and out of engagement with said seat to provide flow thru said valve, said sleeve support means providing a fluid passageway from said seat to the well conduit below said valve; resilient means for biasing said sleeve onto said seat; means in said sleeve for seating and locking a plug to close off the passageway thru said valve to upward flow while providing downward flow under pressure by displacing said sleeve from said seat; and a plug seatable in said sleeve in sealed engagement therewith and having locking means therein for locking said plug in said sealed engagement.

10. The valve of claim 9 wherein the inner wall of said sleeve is provided with an upwardly facing annular shoulder in a lower section and a downwardly facing shoulder in an upper section; and said plug comprises a main cylindrical section attached to a depending stem providing a downwardly facing annular shoulder adapted to engage said upwardly facing shoulder for supporting said plug in said sleeve, a locking ring encircling said main section at a level below said downwardly facing shoulder when said plug is seated, and a sealing ring encircling said main section and adapted to form a seal with the inner wall of said sleeve.

References Cited in the file of this patent

UNITED STATES PATENTS

| | | |
|---|---|---|
| 2,593,520 | Baker et al. | Apr. 22, 1952 |
| 2,630,178 | Brown | Mar. 3, 1953 |
| 2,647,727 | Edwards | Aug. 4, 1953 |